United States Patent
Naaktgeboren et al.

(10) Patent No.: US 7,861,962 B2
(45) Date of Patent: Jan. 4, 2011

(54) TWINE TENSIONING DEVICE FOR A BALER

(75) Inventors: Adrianus Naaktgeboren, Varsenare (BE); Kris Eylenbosch, Ghent (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/409,908

(22) Filed: Mar. 24, 2009

(65) Prior Publication Data
US 2009/0179102 A1 Jul. 16, 2009

Related U.S. Application Data

(62) Division of application No. 11/397,022, filed on Apr. 3, 2006, now Pat. No. 7,527,214.

(30) Foreign Application Priority Data
Apr. 4, 2005 (GB) .................................. 0506793.9

(51) Int. Cl.
*B65H 59/36* (2006.01)
(52) U.S. Cl. .................. 242/417.3; 242/419.7; 242/154
(58) Field of Classification Search .................. 242/417, 242/417.3, 419, 419.4, 419.6, 419.7, 149, 242/153, 154; 100/29, 32
See application file for complete search history.

(56) References Cited

U.S. PATENT DOCUMENTS

| 1,964,496 | A | 6/1934 | Benjamin |
| 2,141,664 | A | 12/1938 | Ossing |
| 3,051,412 | A | 8/1962 | Wilkinson |
| 4,074,623 | A | 2/1978 | White |
| 4,142,746 | A | 3/1979 | White |
| 4,196,661 | A | 4/1980 | Yatcilla et al. |
| 4,455,930 | A | 6/1984 | Crawford |
| 6,224,009 | B1 * | 5/2001 | Zenoni ..................... 242/419.7 |
| 2004/0134360 | A1 | 7/2004 | Rotole |

FOREIGN PATENT DOCUMENTS

| DE | 19508931 A1 | 9/1996 |
| GB | 2141664 A | 1/1984 |

* cited by examiner

*Primary Examiner*—William E Dondero
(74) *Attorney, Agent, or Firm*—Patrick M. Sheldrake; Michael G. Harms

(57) ABSTRACT

A tensioning device is described for mounting between a knotter and a twine supply roll in a baler. The device comprises a spring biased tensioning arm 210 for taking up slack in the twine 216 and a clamp 220 for gripping the twine 216 at a location between the tensioning arm 210 and the supply roll. In the invention, the clamp 220 is coupled to the tensioning arm 210 in such a manner that the force applied by the clamp 220 to grip the twine 216 varies with the position of the tensioning arm 210.

3 Claims, 6 Drawing Sheets

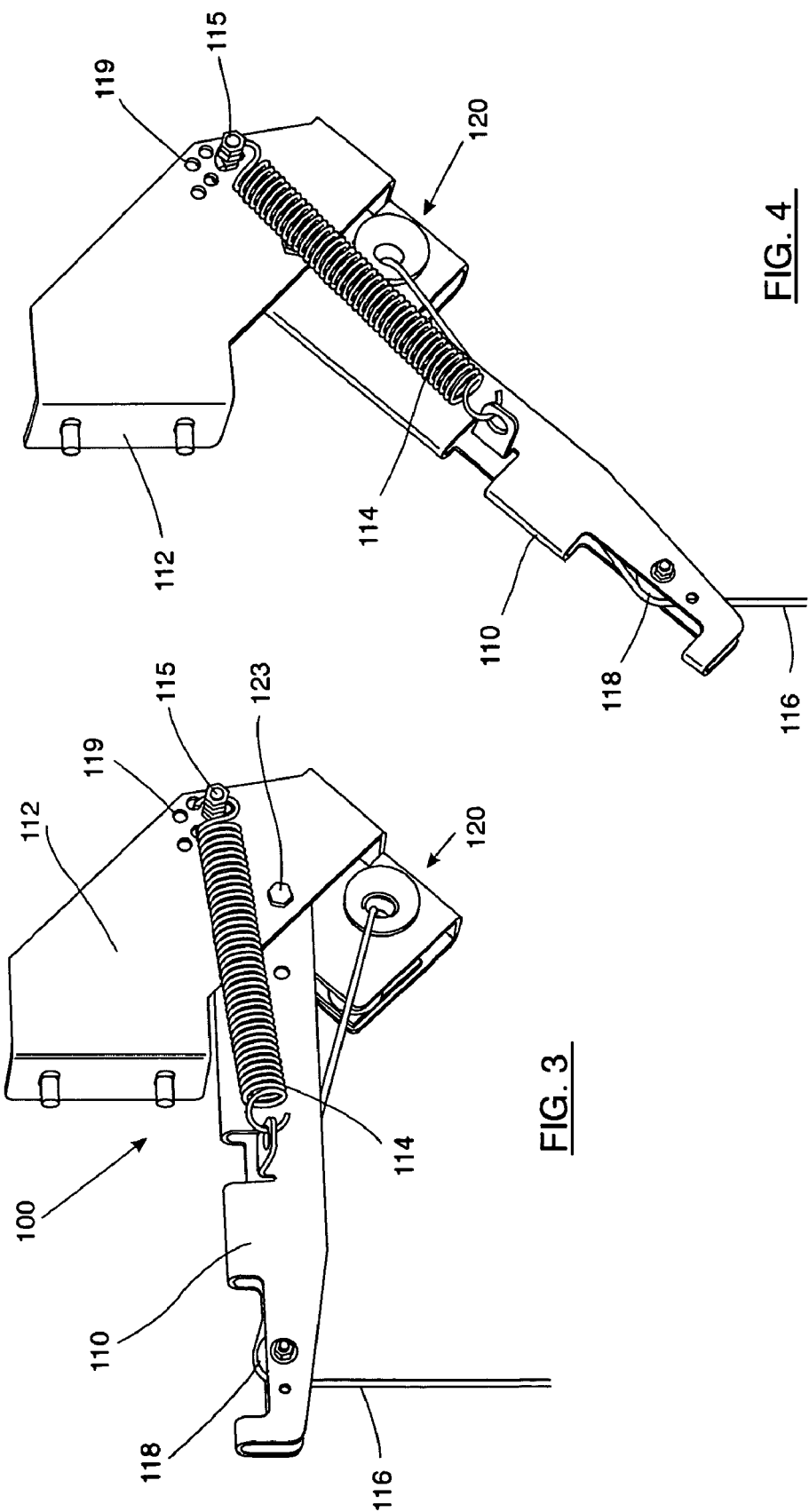

TWINE TENSIONING DEVICE FOR A BALER

This divisional application claims priority under 35 U.S.C. §120 from U.S. patent application Ser. No. 11/397,022 filed on Apr. 3, 2006 now U.S. Pat. No. 7,527,214 by Adrianus Naaktgeboren and Kris Eylenbosch with the same title, the full disclosure of which is hereby incorporated by reference.

FIELD OF THE INVENTION

The present invention relates to a twine tensioning device for a baler.

BACKGROUND OF THE INVENTION

As is well known, a baler is an agricultural machine that picks up crop from the field and gathers it into bales, which can be either rectangular or round. In the case of a square baler, the bales are made in a baling chamber that has a rectangular cross section. The crop picked up from the ground is driven into a feed duct. When the feed duct is full, its contents are partly compressed and pushed upwards by a paddle into the baling chamber. The baling chamber has a reciprocating plunger that compresses this "slice" of crop by pushing it deeper into the baling chamber and the process is repeated for successive slices until the bale has the desired length. At this point, loops of twine are tied around the crop to keep it as a compressed bale. This bale is discharged onto the ground by the next bale that is being formed in the baling chamber, the latter bale pushing against the previously formed and finished bale.

Rectangular bales conventionally are able to maintain their shape because of a series of parallel extending twine loops which are provided lengthways around the bales. Agricultural balers have been available for many years which use automatic knotters that serve to tie one or two conventional knots on every loop for binding a bale. When a bale reaches its desired length, a knotting cycle is started. During this cycle, in the case of a double knotter, two knots are formed, the first knot for closing the loop of the finished bale and the second knot for starting the loop of the next bale. The construction of such balers is well known and is fully documented in numerous prior art references. For this reason, a more detailed explanation of the baler is not deemed to be necessary within the present context.

The construction of the knotters is also well known but will be described herein briefly to explain the background of the invention. The main part of the knotter is a billhook that engages the twines to be tied together while they are held under tension. The billhook is rotated through 360° about an axis perpendicular to the twines and in the process wraps a loop of the twines around itself The twines are then cut and the free end of the twines thus created is pulled through the loop to complete the knot. For a fuller explanation of the operation of the knotter, reference may be made for example to U.S. Pat. No. 4,142,746 which is here incorporated by reference.

It will be noted that, during the formation of the second knot, the billhook needs to operate on a length of twine that is maintained taut. To achieve this, the twine on one side of the billhook is held firmly while on the other the two runs of the twine from the supply rolls are each tensioned by a friction clamp or another tensioning means, such as tensioning rollers, and a spring biased tensioning arm that takes up slack in the twine. A simple clamp can be found in U.S. Pat. No. 4,074,623. Rollers are shown in U.S. Pat. No. 4,196,661.

Two tensioning devices are required for the two runs, which are referred to as the upper and lower tensioning devices. The operation of the lower tensioning device is more critical than the operation of the upper tensioning device, because it is disposed at a greater distance from the knotter, so that there is a greater length of twine which must be jerked away during the final stage of the knotting process. The lower tensioning device thus has to act more vigorously in order to compensate for the stretch of the twine length between the tensioning device and the knotter.

FIGS. 1 and 2 of the accompanying drawings show the construction of a known tensioning device. The tensioning device has a tensioning arm 10 which is shown in FIG. 1 in its raised position and in FIG. 2 in its lower position. The tensioning arm 10 is mounted on a fixed bracket 12 for pivotal movement about a pin 23. At one end, the arm 10 is acted upon by a spring 14 which biases it in a direction to take up slack in the twine 16, which passes around a roller 18 at the free end of the tensioning arm 10. The run 16a of the twine 16 leads to the knotter and the other run 16b is drawn from a supply roll (not shown) through a guide ring 32 and a clamp 20. Within the clamp 20, the twine 16 passes between two cogs 22 and 24, of which the cog 22 is mounted on the stationary bracket 12 and the other is carried by a U-shaped brace 26. At one end, the brace 26 is free to pivot about a support pin 28 while a pair of springs 30 (only one shown), adjustable by means of nuts 34, act on the opposite end of the brace 26 to urge the two cogs towards one another.

The clamp 20 and the tensioning arm 10 maintain the twine under tension both during the formation of a bale and during the tying of a knot. The tension, which is usually adjustable, is set by the nuts 34 acting on the springs 30 of the clamp 20. For good operation, the force applied to the twine by the clamp 20 needs to be greater than the force applied by the tensioning arm 10. The basic function of this arm 10 is to take up the slack twine during and after formation of the second knot. The arm needs to have enough travel to stretch all the slack twine and still to be able to pull the second knot tight after its ejection from the bill hook.

The setting of the twine tension by adjustment of the clamping force on the twine is necessarily a compromise. If the twine is not sufficiently taut, the knots will not be formed properly. Furthermore, if the force of the tensioning arms is greater than the load applied by the clamp or rollers, this will result in there remaining insufficient arm travel for tightening the second knot. Otherwise, too high a tension in the twines causes wear, generates a great deal of noise and increases the risk of the knotter malfunctioning.

It can thus be understood from the above description that the clamp and the tensioning arms are two distinct elements each having their own settings, but nevertheless working closely in conjunction with one another.

OBJECT OF THE INVENTION

The present invention seeks to provide a simple, yet reliable tensioning device that maintains the twine taut during the knotting cycles but allows twine to be drawn off more freely from the supply rolls during the baling process.

SUMMARY OF THE INVENTION

According to the present invention, a tensioning device for mounting between a knotter and a twine supply roll in a baler comprises a spring biased tensioning arm for taking up slack in the twine and a clamp for gripping the twine at a location between the tensioning arm and the supply roll, wherein the clamp is coupled to the tensioning arm in such a manner that the force applied by the clamp to grip the twine varies with the position of the tensioning arm.

In one embodiment of the invention, the clamp comprises a pair of spaced guides through which the twine is threaded and a clamping pin movable between the two guides transversely to the path of the twine, the clamping pin being connected for movement with the tensioning arm.

Conveniently, the clamping pin is directly connected to the tensioning arm and the path of the twine between the two guides is transverse to the length of the tensioning arm.

Advantageously, the load of the arm on the engaged twine is varied with the force applied by the clamp on the twine. Preferably, the tension is low during twine pull, as occurs during bale formation and the upward travel of the needle that feeds the twine to the knotter at the start of the knotting process, and high during the last stage of the knotting process, when the arm tightens the second knot to assure a firm and neat connection. Accordingly, the force applied by the arm increases towards the position of maximum clamping force and decreases towards the position of minimum clamping force.

BRIEF DESCRIPTION OF THE DRAWINGS

The invention will now be described further, by way of example, with reference to the accompanying drawings, in which:

FIG. 3 is a side view of an upper tensioning device embodying the invention showing the tensioning arm in its raised position;

FIG. 4 shows the tensioning device of FIG. 3 in the lowered position of the tensioning arm;

DETAILED DESCRIPTION OF THE PREFERRED EMBODIMENT

Figure 2:
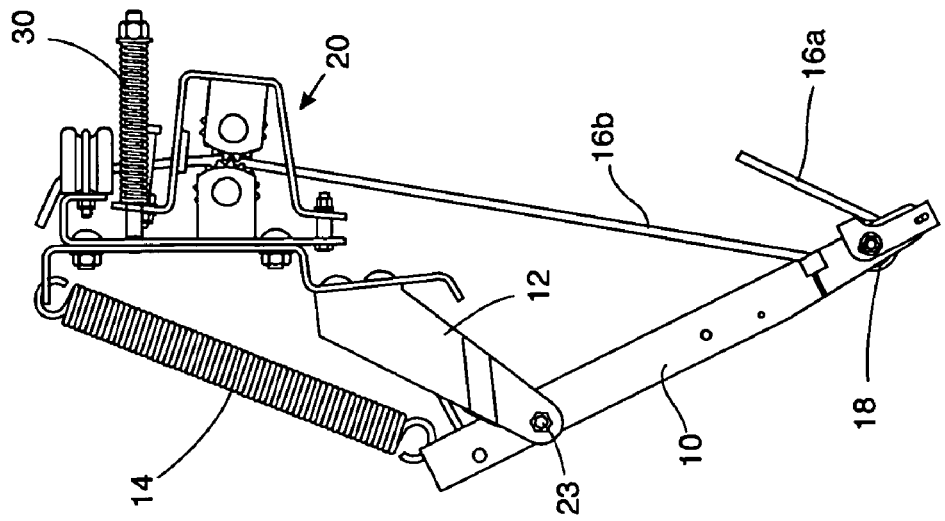
FIGS. 1 and 2 are side views of a prior art lower tensioning device as described previously.

Conventionally, the twine drawn from each of an upper and a lower supply roll passes through a tensioning device such as described above by reference to FIGS. 1 and 2.

As the bale that is being formed grows, twine is drawn from the rolls to lengthen the loop of twine passing around the bale and throughout this time the tension is maintained in each run of the twine by the action of the tensioning arm 10 and the cogs 22 and 24. Once the bale has reached its desired size, a needle raises the lower run of twine to the level of the upper run and introduces both runs into the knotter. The knotter then forms a first knot to complete the bale and a second knot to commence the next bale.

The same tension as is present in the twines during the first stages of the knotting process, is present during the baling process as well as during the time that the lower run of twine is raised by the needle to introduce it into the knotter. The tension on the lower and upper twine runs during the final stage of the knotting process needs to be sufficiently high to form a secure second knot. One of the consequences of this high degree of tension is that when the needle attempts to draw twine rapidly from the lower roll, there is a great deal of vibration and noise, as well as a high risk of knotter malfunction.

The tensioning device 100 shown in FIGS. 3 to 6 can be installed above the baling chamber for tensioning the upper run of twine. It comprises a spring biased tensioning arm 110 and a clamp 120 that are combined into one exchangeable unit. Furthermore, the clamp 120 interacts with the tensioning arm 110 such that the clamping pressure varies with the position of the tensioning arm 110.

The tensioning arm 110 is pivotably mounted on a stationary frame 112 for swinging movement about a pivot 123. Near its free end, the arm 110 carries a freely rotatable pulley 118 over which is guided the twine 116 to be tensioned, the length of twine from the end of the arm 110 being one of the two runs that are wrapped around the bale. A spring 114 urges the arm clockwise as viewed in FIG. 1. The spring force is adjustable by selection the hole 119 in the frame 112 in which an anchoring pin 115 at one end of the spring 110 is received. The spring 110 is positioned such that the pull on the twine is high in the upper position, where the twine 116 is clamped and hence the load on the twine is high. In the lower position, illustrated in FIG. 4, the load is low and the twine 116 can run through the tensioning device 100 with low tension.

Figure 6:
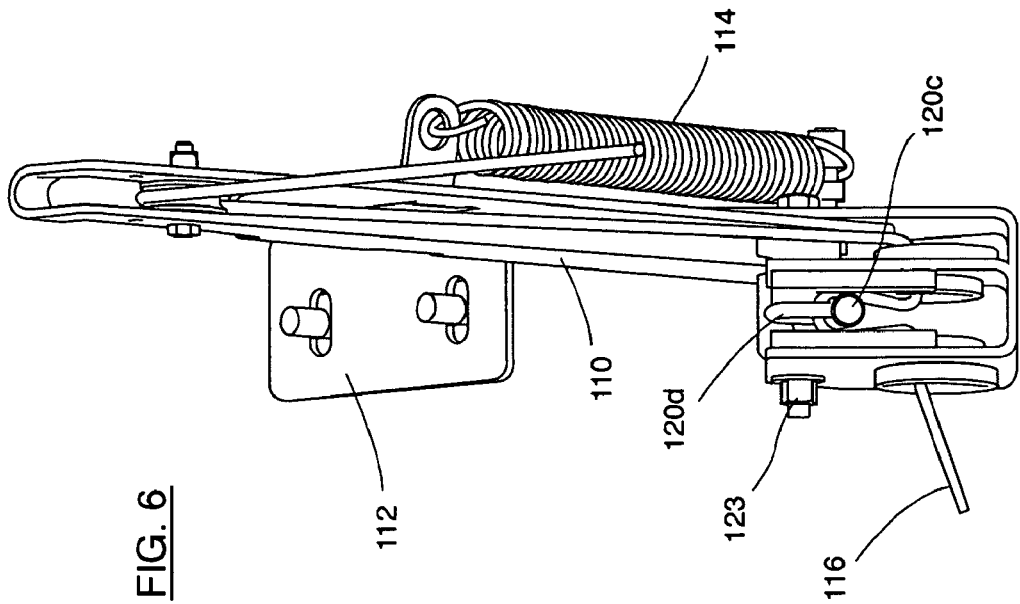
FIG. 6 is an inclined front view of the tensioning device of FIG. 3 with the tensioning arm in its raised position.
Figure 5:
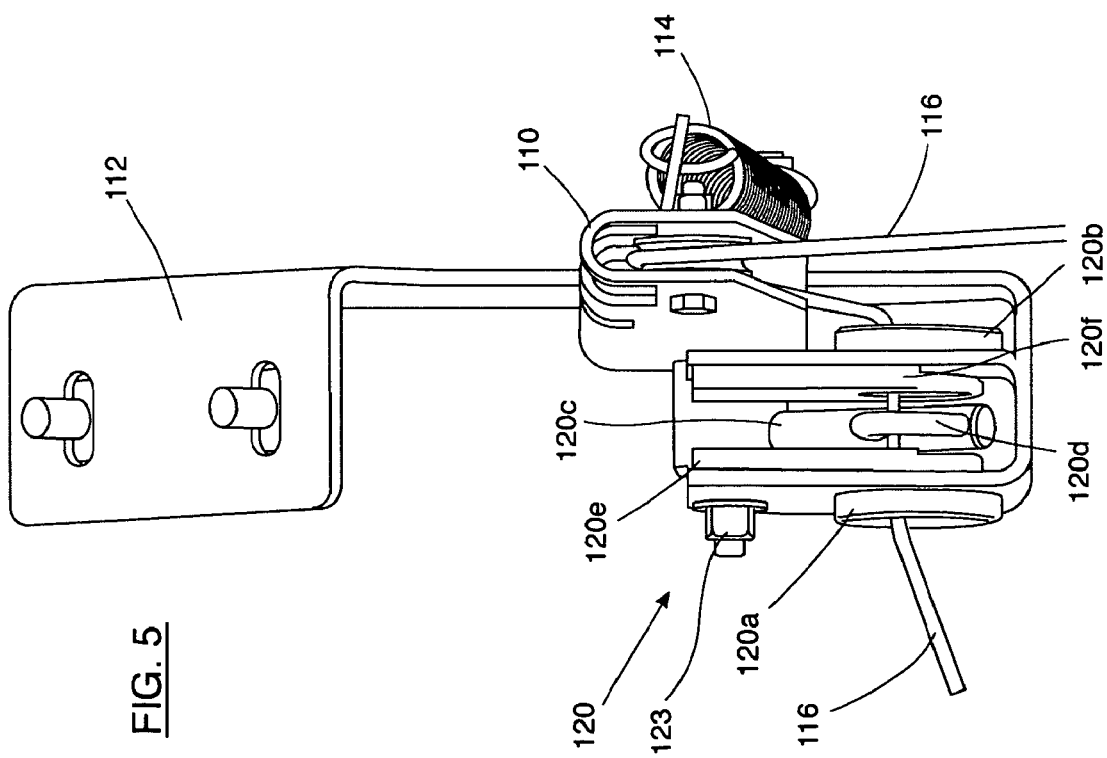
FIG. 5 is an inclined front view of the tensioning device of FIG. 3 with the tensioning arm in its lowered position.

The friction clamp for gripping the twine at a location between the pulley 118 and the supply roll is generally designated 120 in the drawings and is best shown in FIGS. 5 and 6. The clamp 120 comprises two spaced guides 120a and 120b which are constructed as rings. The twine 116 passing through the guides 120a and 120b follows a path perpendicular to the length of the tensioning arm 110 and after passing through the guide 120b, the twine turns through a right angle to pass along the length of the arm 110 towards the pulley 118.

A clamping pin 120c projects radially from the pivot of the arm 110 into the space between the two guides 120a and 120b. In the lowered position of the arm 110 shown in FIG. 5, the clamping pin is withdrawn from between the two guides 120a and 120b allowing twine to be drawn freely from the supply roll. However, in the raised position of the arm 110 shown in FIG. 6, the clamping pin 120c engages and deforms the twine between the two guides 120a and 120b to cause the twine to be gripped firmly. The pin 120c is formed with an eyelet 120d through which the twine is threaded so that as the arm 110 is moved from the position of FIG. 6 to that of FIG. 5, the twine is pulled back into the released position.

It can also be seen from FIGS. 5 and 6 that the gap between the two guides 120a and 120b is reduced by two distinct inner plates 120e and 120f. These plates may be replaceable or adjustable to adapt the size of the gap to suit different types of twine.

During the upward movement of the needle in the first stage of the knotting cycle, the twine 116 can be freely pulled out of the twine supply roll since the tensioning arm is pulled to the position shown in FIG. 5, allowing the twine 116 to move freely through the guides 120a and 120b. The first knot, which closes the loop around the full length bale, is made in the conventional way, under application of moderate tension by the tensioning arm 110 to the twine 116. Then the second knot which ties together the upper and lower twine runs as a starting loop for the next bale to be made, is made again under moderate twine tension. At this stage, any surplus need of twine 116 will be delivered by some slight movement of the tensioning arm 110. During the final phase of the knotting process, immediately after the ejection of the second knot from the bill hook, the knot is released from the knotter assembly. The consequent free length of twine is then taken up by the tensioning arm 110 on the upper twine run. As the tensioning arm 110 moves upwards, the clamping pin 120*c* grips the twine run and pulls it into the high friction position shown in FIG. 6. Simultaneously, the load on the arm 110 from the spring 114 increases as described above, such that it firmly tightens the completed second knot.

The tension arm movements are described for the upper twine run. It has to be understood that the described tensioning device may be applied to the lower twine run as well. For the lower run, the system is placed upside down and the vertical movements consequently are also reversed.

FIGS. 7 to 12 show three further alternative embodiments of the invention, as applied to the lower tensioning device, which is mounted below the baling chamber. These embodiments have many components that are equivalent to components already described by reference the prior art tensioning device described by reference to FIGS. 1 and 2 and to avoid repetition, such components have been allocated similar reference numerals but in the 200, 300 and 400 series, respectively. For example, the tensioning arm 10 of FIGS. 1 and 2 acts in the same way as the tensioning arm 210 of the embodiment of FIGS. 7 and 8, the tensioning arm 310 of the embodiment in FIGS. 9 and 10 and the tensioning arm 410 in the embodiment of FIGS. 11 and 12.

Figure 1:
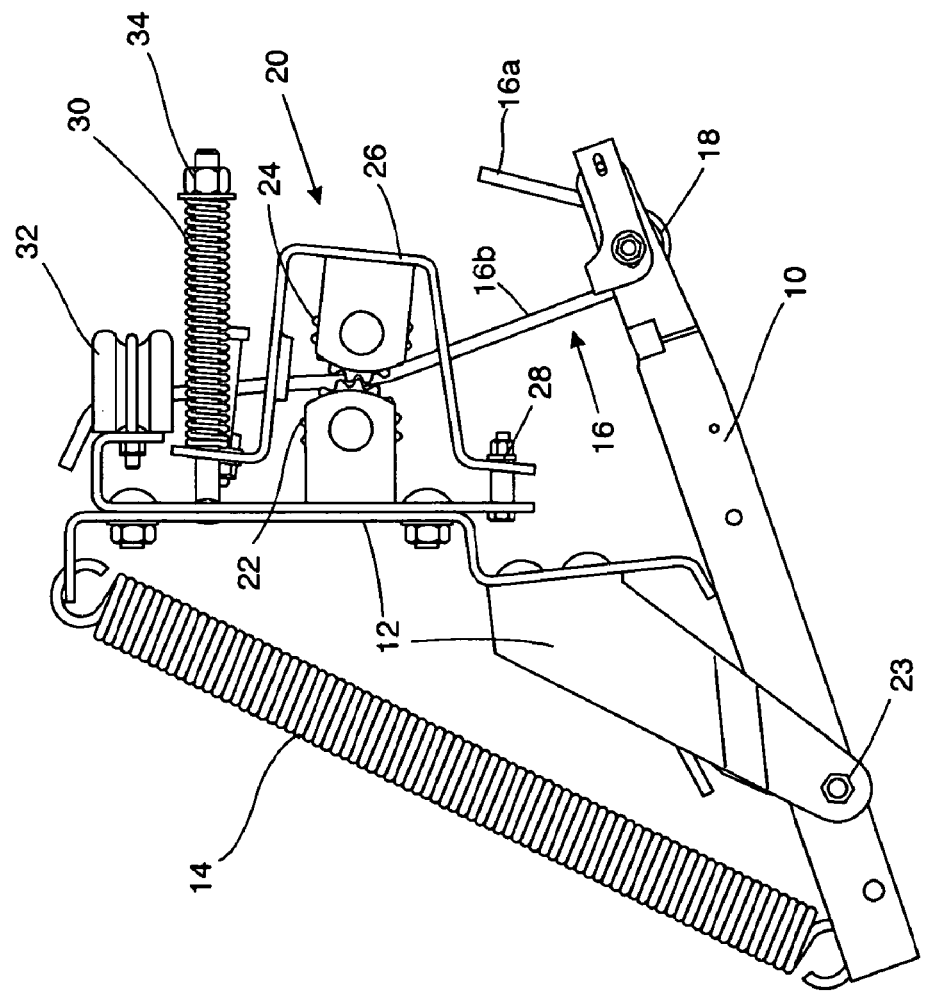

Comparing first to the embodiment of FIGS. 7 and 8 with that of FIGS. 1 and 2, one notes the position of the springs 230 (there are two but only one can be seen in the drawings) has been moved from above the cogs 222 and 224 to below them below. The springs 230 now act on the lower portion of the brace 226, which now has a pivot point 228 above the cogs. At its lower end, the brace is provided with a new guide ring 250, which may alternately be a guide wheel.

Figure 7:
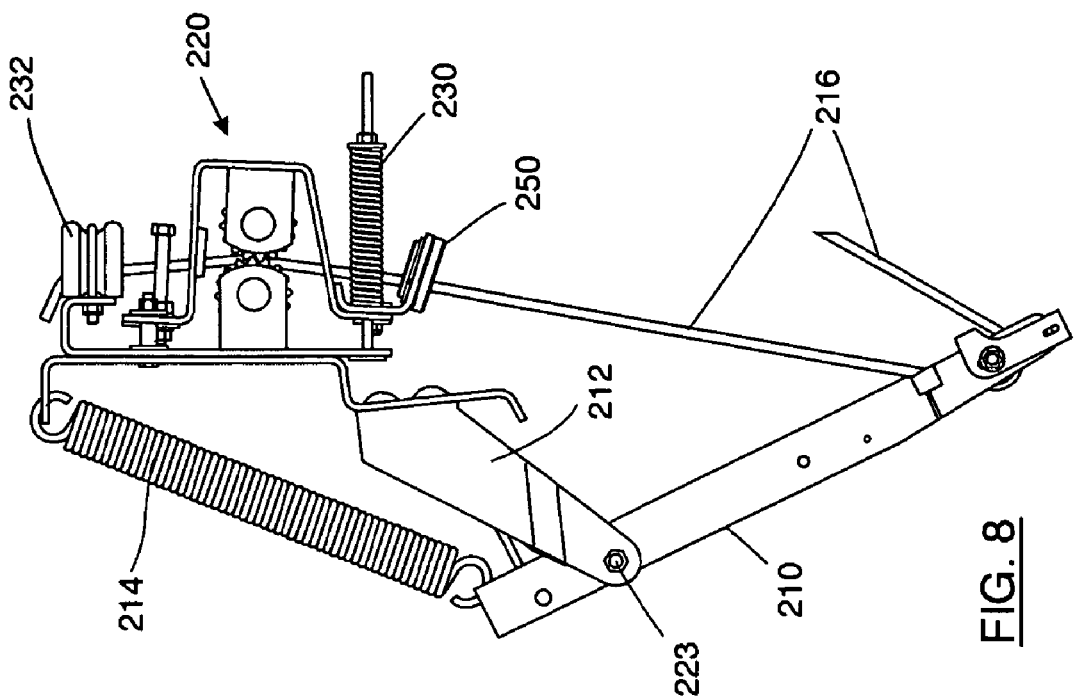
FIG. 7 is a side view of a lower tensioning device of a second embodiment of the invention showing the tensioning arm in its raised position.

During bale formation, the tensioning arm 210 is pulled to its upper position, shown in FIG. 7, and the twine 216 pulls the guide ring 250 at an angle, away from the bracket 212. The action of the twine tension on the guide ring 250 opposes the force of the springs 230 and reduces the gripping force applied by the cogs 222 and 224 to the twine 216. An equilibrium of forces will be reached in that an increased twine tension, caused by a large clamping force of the cogs, will result in an increase in the force applied by the twine 216 in opposition to the springs 230 and this will reduce the clamping force. Conversely, too small a twine tension reduces the force opposing the springs 230 and this will cause an increase in clamping force. This self-regulating system copes with the tension variations which follow from changes to the cog surface (e.g. from wear or oxidation) and the cog rotation resistance (e.g. from oxidation of its seating on its mounting bolt or ingress of dirt).

Figure 8:
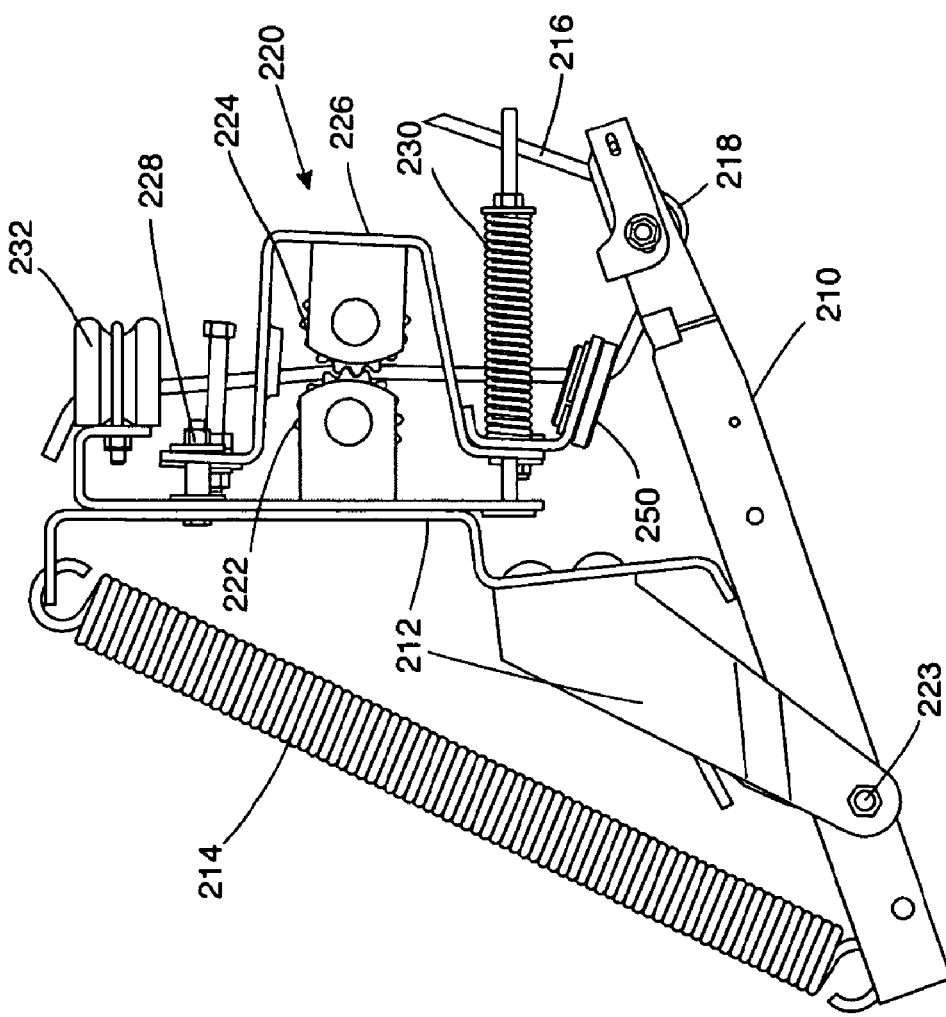
FIG. 8 shows the tensioning device of FIG. 7 in the lowered position of the tensioning arm.

During the final stage of the knotting process, enough slack is provided to lower the arm for it to move to the position shown in FIG. 8. The twine 216 no longer applies a force to the brace 226 in opposition to the springs 230 and the full force of the springs 230 is applied to the cogs 222 and 224.

It will be noted that in common with the embodiment of the upper tensioning device shown in FIGS. 3 to 6, in the embodiment of FIGS. 7 and 8 the gripping force applied to the twine 216 varies in dependence upon the position of the tensioning arm 210. This feature is also common to the two embodiments described hereinafter.

Figure 10:
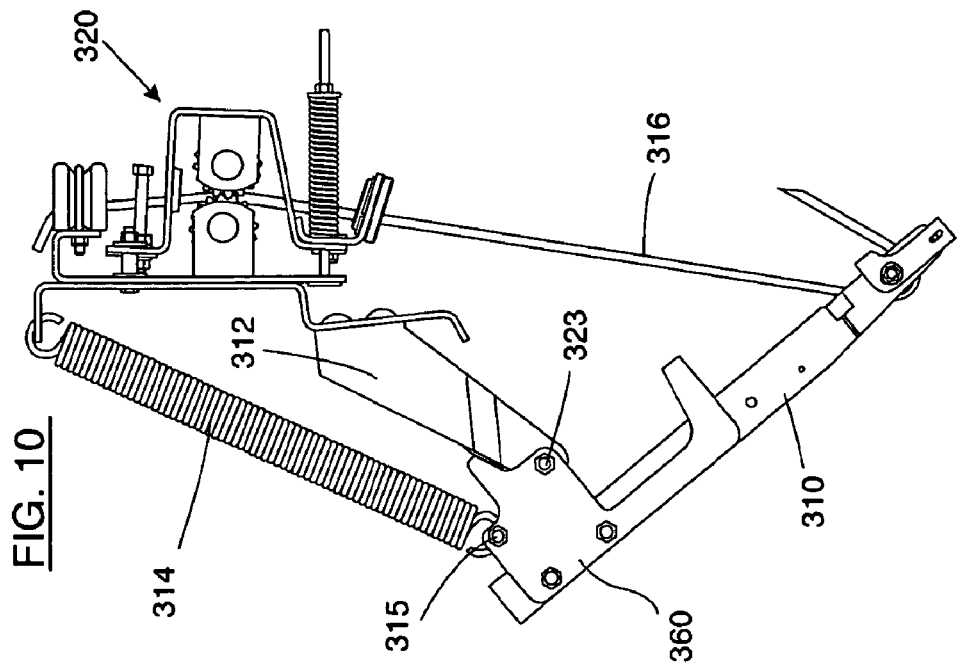
FIG. 10 shows the tensioning device of FIG. 9 in the lowered position of the tensioning arm.
Figure 9:
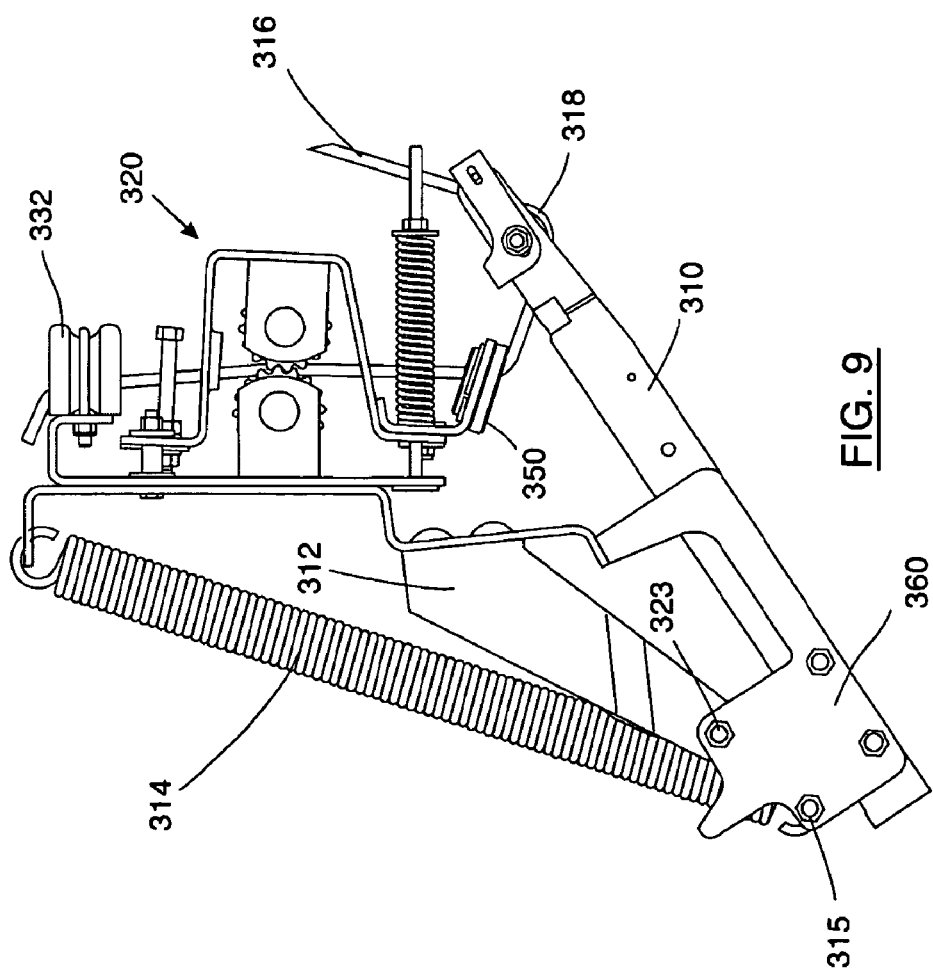
FIG. 9 is a side view of a lower tensioning device of a third embodiment of the invention showing the tensioning arm in its raised position.

The embodiment of FIGS. 9 and 10 differs from that of FIGS. 7 and 8 only by the addition of a pivot plate 360 to the tensioning arm 310. The long spring 314 now acts on the pivot plate 360 instead acting directly on the arm 310. The positioning of the attachment point 315 of the spring 314 and the stops on the pivot plate 360 is such that the resulting torque applied to the tensioning arm 310 by the spring 314 is modified.

The torque applied to the tensioning arm 310 by the spring 314 depends not only on the tension in the spring 314 but also on the length of the lever arm, that is to say the perpendicular distance between the line of action of the spring 314 and the pivot point 323 of the tensioning arm 310.

The embodiment of FIGS. 7 and 8, has a small lever arm when the tensioning arm 210 is down and the spring is retracted (as shown in FIG. 8). The resulting torque is small. However, this is the position where it is desired to exert a large force on the twine in order to tighten the second knot. The geometry of the embodiment of FIGS. 9 and 10 changes the spring attachment such that the lever arm through which the spring 314 acts increases during the downward movement of the tensioning arm 310 and the retraction of the spring 314. The combination of these factors results in a constantly increasing torque. The available force on the twine 316 at the end of the tensioning arm 310 is greatest at the end of its travel, such that the knot can be tightened vigorously. The pulling force effect of the modified mounting of the tensioning arm 310 is combined with the retaining force effect of the cogs of the clamp 320, such that there is no erratic twine feed from the supply roll.

Figure 12:
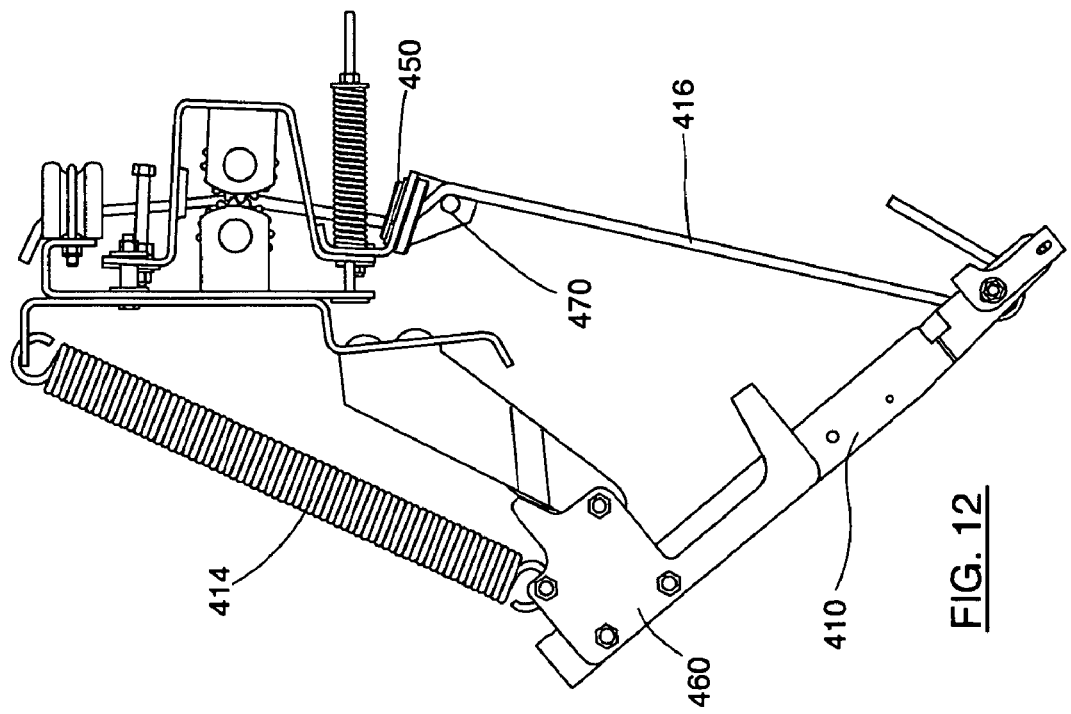
FIG. 12 shows the tensioning device of FIG. 11 in the lowered position of the tensioning arm.
Figure 11:
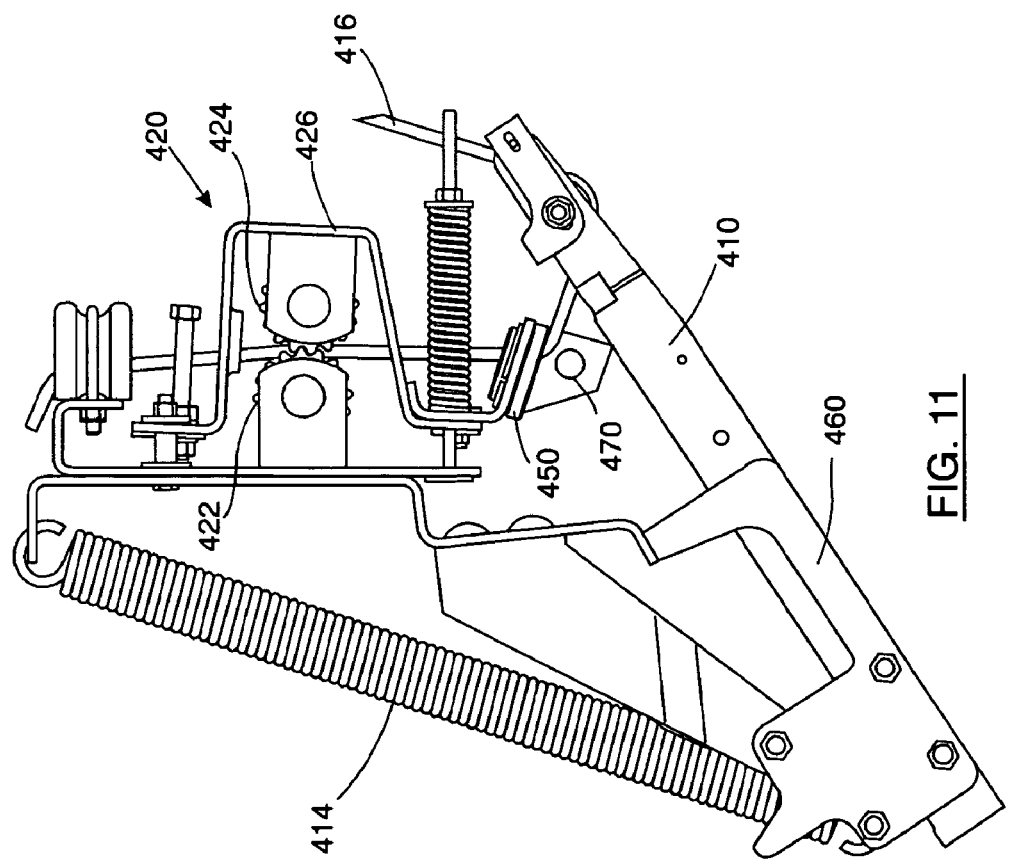
FIG. 11 is a side view of a lower tensioning device of a fourth embodiment of the invention showing the tensioning arm in its raised position.

The embodiment of FIGS. 11 and 12 differs from that of FIGS. 9 and 10 in that a transverse bolt or pin 470 is installed below the guide ring 450 (or guide wheel) of the brace 426 of the clamping device 420. In the raised position of the tensioning arm 410, the twine 416 by-passes the pin 416, such that the forces and tensions correspond exactly to those of the embodiment of FIGS. 9 and 10. However, when the knotting system provides slack twine, the tensioning arm 410 is lowered and the spring 414 retracts the tensioning arm 401 further, thereby routing the twine 416 over the pin 470.

The effect of this is twofold. First, the curving of the twine around the pin 470 adds frictional resistance to the twine feed, and, second, the force of the twine on the pin 470 loads the brace 426 to increase the clamping force applied by the cogs 422 and 424 to the twine 416. Both effects help in immobilising the twine 416 from the supply roll, such that the tensioning arm 410 pulls with its full force on the run of the twine leading to the knotter. The second knot is tightened adequately, such that it cannot slip loose during the forming of the next bale.

The invention claimed is:

1. A tensioning device for mounting between a knotter and a twine supply roll in a baler comprising:

a tensioning arm biased by a spring for taking up slack in twine and a clamp for gripping the twine at a location between the tensioning arm and the supply roll;

the clamp comprising a first guide and a second guide forming a twine path configured for threading therethrough the twine and engaging the twine and a clamping pin between the two guides transversely to the path of the twine:

the clamping pin directly connected with the tensioning arm for movement with the tensioning arm between clamped and unclamped positions; the clamp is coupled to the tensioning arm in such a manner that the force applied by the clamp varies with the position of the tensioning arm;

and the clamping pin in the clamped position is configured to grip and deform the twine between the clamping pin and two guides;

the twine path through the guides is transverse to the length of the tensioning arm and after passing through the guides the twine is directed generally perpendicularly to the guides along the length of the arm towards a tensioning member connected to an end portion of the tensioning arm; and the spring attached to the tensioning arm and configured such that in a first position of the tensioning arm the pull on the twine is higher than at a second position of the tensioning arm, the first position corresponding to the clamped position of the pin and the second position of the arm and spring are configured to correspond to the unclamped position of the clamping pin.

2. A tensioning device as claimed in claim 1, wherein the spring acting on the tensioning arm is positioned such that the resulting force of the arm on the engaged twine varies with the force applied by the clamp.

3. A tensioning device as claimed in claim 2, wherein the spring and tensioning arm are configured such that the resulting force on the engaged twine increases towards the position of maximum clamping force and decreases towards the position on minimum clamping force.

* * * * *